JOHN R. LOMAS.
Improvement in Music Stools and Book-Racks Combined.
No. 115,332. Patented May 30, 1871.

Witnesses:
A. Bennerkendorf
Wm. H. C. Smith

Inventor:
J. R. Lomas.
PER
Attorneys.

UNITED STATES PATENT OFFICE.

JOHN R. LOMAS, OF NEW HAVEN, CONNECTICUT, ASSIGNOR TO B. SHONINGER, OF SAME PLACE.

IMPROVEMENT IN MUSIC-STOOLS AND BOOK-RACKS COMBINED.

Specification forming part of Letters Patent No. 115,332, dated May 30, 1871.

*To all whom it may concern:*

Be it known that I, JOHN R. LOMAS, of New Haven, in the county of New Haven and State of Connecticut, have invented a new and Improved Music-Stool and Book-Rack; and I do hereby declare that the following is a full, clear, and exact description thereof, which will enable others skilled in the art to make and use the same, reference being had to the accompanying drawing forming part of this specification.

My invention relates to compound music stools and racks; and consists in an improved construction thereof, whereby the stool and rack are combined adjustably. The invention consists in a novel arrangement of the stand which contains the female screw, in which the screw of the seat works to constitute a book rack or case.

Figure 1:
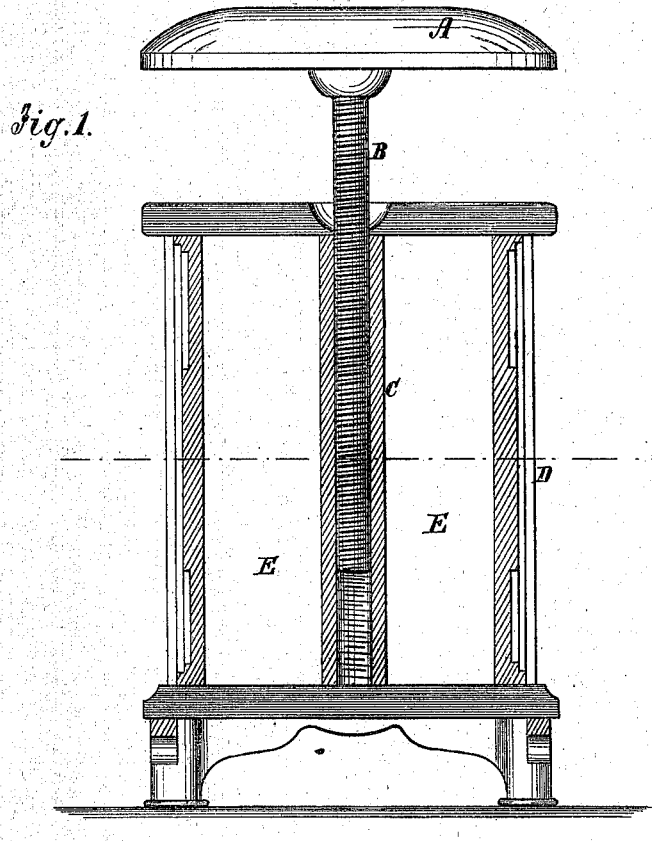
Figure 2:
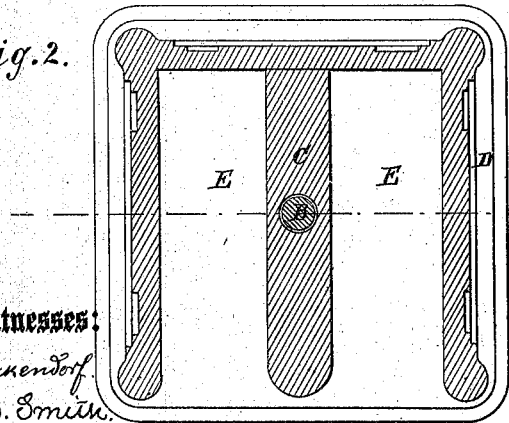

Figure 1 is a sectional elevation of the stand on the line $x\,x$ of Fig. 2, and Fig. 2 is a horizontal section of Fig. 1 on the line $y\,y$.

Similar letters of reference indicate corresponding parts.

The seat A and the screw B supporting it are of ordinary or any approved construction, but the stand for the support of the female screw or nut C constitutes a book rack or case, D, which may be of any approved form, with the chambers E, one or more, in which the music or other books may be placed. A door may be provided for closing the said chambers or not, as preferred. I prefer to arrange the female screw C in a partition between two chambers, but it may be so or not, as preferred.

I do not limit myself to any particular construction or arrangement of the case or rack, except that it forms the support of the screw C.

Having thus described my invention, I claim as new and desire to secure by Letters Patent—

The seat A and screw B, combined with a music-rack having partition C containing nut in which the stool-screw is adjusted.

JOHN R. LOMAS.

Witnesses:
WILSON H. CLARK,
M. L. BALDWIN.